US012625789B2

(12) United States Patent
Kotake et al.

(10) Patent No.: US 12,625,789 B2
(45) Date of Patent: May 12, 2026

(54) STORAGE SYSTEM, LEARNING MODEL, AND LEARNING MODEL GENERATION METHOD

(71) Applicant: Hitachi, Ltd., Tokyo (JP)

(72) Inventors: Yuki Kotake, Tokyo (JP); Akihiro Shikano, Tokyo (JP); Atsushi Sato, Tokyo (JP); Mizuho Mogi, Tokyo (JP); Minoru Kobayashi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 29 days.

(21) Appl. No.: 18/610,376

(22) Filed: Mar. 20, 2024

(65) Prior Publication Data

US 2024/0427678 A1     Dec. 26, 2024

(30) Foreign Application Priority Data

Jun. 23, 2023    (JP) ................................. 2023-103381
Jul. 19, 2023    (JP) ................................. 2023-117605

(51) Int. Cl.
*G06F 11/22*          (2006.01)

(52) U.S. Cl.
CPC ................................. *G06F 11/2257* (2013.01)

(58) Field of Classification Search
CPC .... G06F 11/2257; G06F 3/061; G06F 3/0679; G06N 3/0985
USPC .......................................................... 714/26
See application file for complete search history.

(56) References Cited

U.S. PATENT DOCUMENTS

2021/0264298 A1*   8/2021  Elyasi ................... G06N 20/00

FOREIGN PATENT DOCUMENTS

JP        2021-043891 A       3/2021

OTHER PUBLICATIONS

Wikipedia "Training, validation, and test data sets" page, retrieved from https://en.wikipedia.org/wiki/Training,_validation,_and_test_data_sets#:~:text=In%20order%20to%20avoid%20overfitting,%2Dmeasure%2C%20and%20so%20on. (Year: 2025).*

* cited by examiner

*Primary Examiner* — Yair Leibovich
(74) *Attorney, Agent, or Firm* — MATTINGLY & MALUR, PC

(57) ABSTRACT

A failure predictor of a drive apparatus in a storage system is detected more accurately. A control apparatus 1 for a storage system S stores a learning model(s) 132M for evaluating response performance of a drive apparatus 3 with respect to execution of a command relating to input and output by the control apparatus 1. The control apparatus 1 acquires operation information of the drive apparatus 3 and inputs specified information regarding commands, which is included in the operation information, to the learning model 132M. The control apparatus 1 judges a failure predictor of the drive apparatus 3 on the basis of output relating to the response performance by the learning model 132M in response to the input of the specified information.

11 Claims, 14 Drawing Sheets

Drive Apparatus Failure Predictor
Judgment Processing

FIG. 2

Learning Model Management Table    131

| Drive Type | Capacity | Learning Model Number |
|------------|----------|------------------------|
| A | 100GB | 1 |
| B | 300GB | 2 |
| C | 600GB | 3 |
| D | 1200GB | 3 |
| ... | | |

FIG. 3

Learning Model Pool    132

| Learning Model Number | Model Parameters |
|------------------------|-------------------|
| 1 | (w11, w12 ,w13…… w1y, b) |
| 2 | (w21, w22 ,w23…… w2y, b) |
| 3 | (h31, h32 ,h33…… h3y, b) |
| 4 | (h41, h42 ,h43…… h4y, b) |
| 5 | (hy1, hy2 ,hy3…… hyx, b) |
| ... | |

Failure Predictor Judgment Result Table

133

| Drive Apparatus ID | Learning Model Number | Command Information<br>Read Transfer Block Length,<br>Write Transfer Block Length<br>Read Command Count,<br>Write Command Count | Evaluation Threshold | Actual Measurement Value of Response Performance Data | Failure Predictor Judgment Result |
|---|---|---|---|---|---|
| 1 | 1 | Read: 256 KB, Write: 128 KB<br>Read: 1000 Commands, Write: 2000 Commands | 100 | 90 | 0 |
| 2 | 2 | Read: 256 KB, Write: 128 KB<br>Read: 3000 Commands, Write: 2000 Commands | 150 | 200 | 1 |
| 3 | 3 | Read: 256 KB, Write: 128 KB<br>Read: 1000 Commands, Write: 2000 Commands | 90 | 56 | 0 |
| ⋮ | · | · | · | · | · |
| 19 | 5 | Read: 256 KB, Write: 128 KB<br>Read: 1000 Commands, Write: 1000 Commands | 80 | 56 | 0 |
| 20 | 8 | Read: 256 KB, Write: 128 KB<br>Read: 3000 Commands, Write: 2000 Commands | 79 | 45 | 0 |
| 21 | 9 | Read: 256 KB, Write: 64 KB<br>Read: 1000 Commands, Write: 3000 Commands | 45 | 40 | 0 |
| ⋮ | | | | | |

FIG. 5

Response Performance Measurement I/O Pattern Table     431

| Number | I/O Pattern |
|--------|-------------|
| 1 | Random pattern Transfer length Write 512 KB Read -  Write 100% Read 0% |
| 2 | Random pattern Transfer length Write 512 KB Read 512 KB  Write 75% Read 25% |
| 3 | Random pattern Transfer length Write 512 KB Read 512 KB  Write 50% Read 50% |
| 4 | Random pattern Transfer length Write 512 KB Read 512 KB  Write 25% Read 75% |
| 5 | Random pattern Transfer length Write - Read 512 KB  Write 0% Read 100% |
| 6 | Random pattern Transfer length Write 64 KB Read -  Write 100% Read 0% |
| 7 | Random pattern Transfer length Write 64 KB Read 64 KB  Write 25% Read 75% |
| 8 | Random pattern Transfer length Write 64 KB Read 64 KB  Write 50% Read 50% |
| 9 | Random pattern Transfer length Write 64 KB Read 64 KB  Write 25% Read 75% |
| 10 | Random pattern Transfer length Write - Read 64 KB  Write 0% Read 100% |
| 11 | Random pattern Transfer length Write 64 KB Read -  Write 100% Read 0% |
| 12 | Random pattern Transfer length Write 64 KB Read 64 KB  Write 25% Read 75% |
| 13 | Random pattern Transfer length Write 64 KB Read 64 KB  Write 50% Read 50% |
| 14 | Random pattern Transfer length Write 64 KB Read 64 KB  Write 25% Read 75% |
| 15 | Random pattern Transfer length Write - Read 64 KB  Write 0% Read 100% |
| 16 | Random pattern Transfer length Write 512 KB Read 64KB  Write 75% Read 25% |
| 17 | Random pattern Transfer length Write 512 KB Read 64 KB  Write 50% Read 50% |
| 18 | Random pattern Transfer length Write 512 KB Read 64 KB  Write 25% Read 75% |
| 19 | Random pattern Transfer length Write 64 KB Read 512 KB  Write 25% Read 75% |
| 20 | Random pattern Transfer length Write 64KB Read 512 KB  Write 50% Read 50% |
| 21 | Random pattern Transfer length Write 64 KB Read 512K   Write 75% Read 25% |
| . . . | |

FIG. 6

Drive Apparatus Response Performance Data Table

432

| Number | I/O Pattern | Response Performance Data |
|---|---|---|
| 1 | Random pattern Transfer length Write 512 KB Read - Write 100% Read 0% | Min. 100ms Ave.150ms Max. 200ms |
| 2 | Random pattern Transfer length Write 512 KB Read 512 KB Write 75% Read 25% | Min. 110ms Ave.160ms Max. 210ms |
| 3 | Random pattern Transfer length Write 512 KB Read 512 KB Write 50% Read 50% | Min. 90ms Ave.140ms Max. 220ms |
| : | | : |
| : | | : |
| 19 | Random pattern Transfer length Write 64 KB Read 512 KB Write 25% Read 75% | Min. 80ms Ave.140ms Max. 220ms |
| 20 | Random pattern Transfer length Write 64KB Read 512 KB Write 50% Read 50% | Min. 80ms Ave.140ms Max. 320ms |
| 21 | Random pattern Transfer length Write 64 KB Read 512K Write 75% Read 25% | Min. 90ms Ave.140ms Max. 320ms |
| : | | |

Drive Apparatus Failure Predictor
Judgment Processing

Learning Model Generation Processing

STORAGE SYSTEM, LEARNING MODEL, AND LEARNING MODEL GENERATION METHOD

CROSS-REFERENCE TO RELATED APPLICATION

This application is based upon and claims the benefit of priority of the prior Japanese Patent Application No. 2023-117605, filed on Jul. 19, 2023, the entire contents of which are incorporated herein by reference.

BACKGROUND

Generally, regarding a storage system, when response performance of a drive apparatus with respect to an I/O (Input-Output) request from a host becomes less than a threshold value, a failure predictor is detected. Alternatively, response performance of drive apparatuses belonging to the same RAID (Redundant Array of Inexpensive Disks) of the storage system is compared with each other and the failure predictor will be detected in a drive apparatus which is relatively delayed.

There is also a conventional technology that detects a failure predictor of a drive apparatus by using a machine learning model(s).

For example, Japanese Patent Application Laid-Open No. 2021-43891 discloses a technology detects the failure predictor of a drive apparatus on the premise that drive apparatuses have the same workload if they belong to the same parity group. However, there is a problem in a case of the storage system, like an SDS(s) which has become widespread in recent years, where the drive apparatuses which belong to the same parity group may not have the same workload, so that the failure predictor of a drive apparatus cannot be detected accurately. The SDS is Software Defined Storage.

The present invention was devised in light of the above-described circumstance and it is an object of the invention to detect the failure predictor in a drive apparatus in the storage system more accurately.

SUMMARY

One aspect for solving the above-described problem is a storage system including a drive apparatus for storing data and a control apparatus for controlling input and output of data to and from the drive apparatus, wherein the control apparatus has a processor and a memory; wherein the memory stores a learning model for evaluating response performance of the drive apparatus with respect to execution of a command relating to the input and output by the control apparatus; and wherein the processor: acquires operation information of the drive apparatus; inputs specified information regarding the commands included in the operation information to the learning model; and judges a failure predictor of the drive apparatus based on output relating to the response performance by the learning model in response to the input of the specified information.

According to the present invention, the failure predictor of the drive apparatus in the storage system can be detected more accurately.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF DRAWINGS

FIG. 2 is a diagram illustrating the structure of a learning model management table according to Embodiment 1;

FIG. 3 is a diagram illustrating the structure of a learning model pool according to Embodiment 1;

FIG. 4 is a diagram illustrating the structure of a failure predictor judgment result table according to Embodiment 1;

FIG. 5 is a diagram illustrating the structure of a response performance measurement I/O pattern table according to Embodiment 1;

FIG. 6 is a diagram illustrating the structure of a drive apparatus response performance data table according to Embodiment 1;

FIG. 7 is a diagram illustrating the configuration and processing a control apparatus according to Embodiment 1;

FIG. 8 is a diagram illustrating the configuration and processing of the learning model generation apparatus according to Embodiment 1;

DESCRIPTION OF EMBODIMENTS

Embodiments will be described with reference to the drawings. Incidentally, the embodiments describe below do not limit the invention according to the scope of claims and not all miscellaneous elements explained in the embodiments and all their combinations are necessarily essential to the solving means of the invention.

Programs for implementing the respective processing function units described below are executed by a processor and thereby perform defined processing by using storage resources (for example, a memory) and/or communication interface devices (for example, ports) as appropriate. The processor is, for example, a CPU (Central Processing Unit). Accordingly, the processing executed by each processing function unit may be processing performed by the processor or a computer which has the processor.

In the description below, various kinds of information will be expressed in a table format; however, the information is not limited to the table format and may be CSV (Comma Separated Values) or in other formats. Since the various kinds of information does not depend on a data format, for example, an "XXX table" can be also called "XXX information."

Among items of the various kinds of information, names of items such as "Identification Information," "ID," and "Name" which include, in their item names, information for distinguishing the relevant record from other records may be replaced with each other. For example, a "User ID" may be replaced with "User Identification Information."

Embodiment 1

Configuration of Storage System S and Learning Model Generation Apparatus 4

Figure 1:
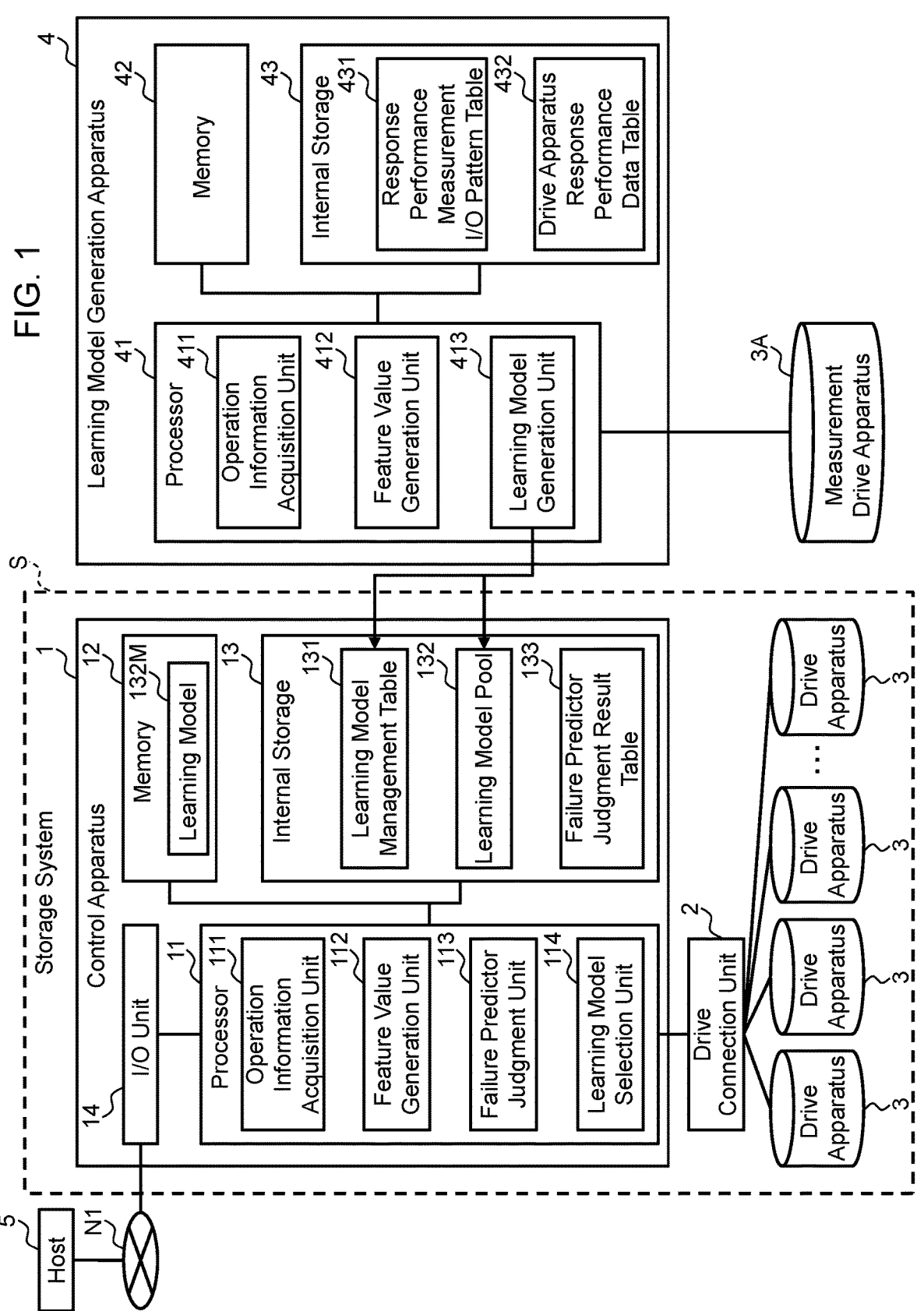
FIG. 1 is a diagram illustrating the configuration of a storage system and a learning model generation apparatus according to Embodiment 1.

FIG. 1 is a diagram illustrating the configuration of a storage system S and a learning model generation apparatus 4 according to Embodiment 1.

The storage system S has a control apparatus 1, a drive connection unit 2, and one or a plurality of drive apparatuses 3.

The drive connection unit 2 connects the control apparatus 1 with the plurality of drive apparatuses 3. The drive connection unit 2 is a PCIe Switch, an SAS Expander, or the like, but it may be omitted. In other words, the drive apparatus 3 may be configured to be directly connected to a processor 11 for the control apparatus 1.

Configuration of Control Apparatus 1

The control apparatus 1 has, as illustrated in FIG. 1, the processor 11, a memory 12, an internal storage 13, and an I/O (Input/Output) unit 14.

The processor 11 implements an operation information acquisition unit 111, a feature value generation unit 112, a failure predictor judgment unit 113, and a learning model selection unit 114 by execution of programs in cooperation with the memory.

The memory 12 is a storage device such as a DRAM (Dynamic Random Access Memory) and stores a learning model 132M which is currently selected.

The internal storage 13 is a nonvolatile storage device(s) such as an HDD(s) (Hard Disk Drive(s)) and an SSD(s) (Solid State Drive(s)). The internal storage 13 stores a learning model management table 131 (FIG. 2), a learning model pool 132 (FIG. 3), and a failure predictor judgment result table 133 (FIG. 4).

Structure of Learning Model Management Table 131

FIG. 2 is a diagram illustrating the structure of the learning model management table 131 according to Embodiment 1. The learning model management table 131 is a table for managing learning models 132M (FIG. 3) on the basis of each drive type and capacity class and has columns of a "Drive Type," "Capacity," and "Learning Model Number." The "Drive Type" is information for identifying the relevant model such as a model number of the relevant drive apparatus 3. The "Capacity" is a storage capacity of the drive apparatus 3. The "Learning Model Number" is identification information of the learning model 132M.

Structure of Learning Model Pool 132

FIG. 3 is a diagram illustrating the structure of the learning model pool 132 according to Embodiment 1. The learning model pool 132 is a table for managing learning models 132M on the basis of each drive type and capacity class of the drive apparatus 3 and has columns of a "Learning Model Number" and "Model Parameters." The "Learning Model Number" is similar to the "Learning Model Number" of the learning model management table 131. The "Model Parameters" are model parameters of the learning model 132M identified with the "Learning Model Number."

Structure of Failure Predictor Judgment Result Table 133

FIG. 4 is a diagram illustrating the structure of the failure predictor judgment result table 133 according to Embodiment 1. The failure predictor judgment result table 133 is the judgment results of the failure predictor of the drive apparatus 3 based on operation information of the drive apparatus 3. The failure predictor judgment result table 133 has columns of a "Drive Apparatus ID," a "Learning Model Number," "Command Information," an "Evaluation Threshold," an "Actual Measurement Value of Response Performance Data," and a "Failure Predictor Judgment Result."

The "Drive Apparatus ID" is information for identifying the drive apparatus 3. The "Learning Model Number" is information for identifying the learning model 132M used to judge the failure predictor. The "Command Information" is information of a transfer block length and a command count of each of read commands and write commands used for the failure predictor judgment indicated in the relevant row.

The "Evaluation Threshold" is a threshold value of the response performance data of the drive apparatus 3, which is output by inputting commands indicated in the "Command Information" to the learning model 132M with the "Learning Model Number," to judge the failure predictor of the drive apparatus 3 with the "Drive Apparatus ID."

The "Actual Measurement Value of Response Performance Data" is the response performance data of the drive apparatus 3 measured when actually transmitting the commands indicated in the "Command Information" to the relevant drive apparatus 3.

In this embodiment, the response performance is response time of the drive apparatus 3 with respect to the input-output commands. However, without limitation to this example, the response performance may be latency, IOPS (Input/Output Per Second), throughput, etc.

If the response time data or the latency of the drive apparatus 3 exceeds the "Evaluation Threshold," it is judged that the drive apparatus 3 shows signs of failure; and if the response time data or latency of the drive apparatus 3 is equal to or less than the "Evaluation Threshold," it is judged that the drive apparatus 3 does not have the failure predictor. Alternatively, if the IOPS or the throughput is less than the "Evaluation Threshold," it is judged that the drive apparatus 3 shows signs of failure; and if the IOPS or the throughput is equal to or more than the "Evaluation Threshold," it is judged that the drive apparatus 3 does not have the failure predictor.

Regarding the "Failure Predictor Judgment Result," "1" is stored if it is judged that the drive apparatus 3 shows signs of failure; and "0" is stored if it is judged that the drive apparatus 3 does not show signs of failure.

Referring back to the explanation of FIG. 1, the I/O unit 14 is an interface which supports the Fiber Channel, iSCSI, NVMe over fabric, etc. The I/O unit 14 sends/receives input-output commands to the storage system S and responses to the host 5 regarding the input-output commands between the I/O input 14 and the host 5 via a front-end network N1.

Configuration of Learning Model Generation Apparatus 4

The learning model generation apparatus 4 has a processor 41, a memory 42, and an internal storage 43 as illustrated in FIG. 1. The learning model generation apparatus 4 may have a communication interface (which is not illustrated in the drawing) for performing communication by connecting with a network (which is not illustrated in the drawing), and a medium reader/writer (which is not illustrated in the drawing) for writing/reading data to/from a semiconductor storage medium and/or a magnetic storage medium.

The processor 41 implements an operation information acquisition unit 411, a feature value generation unit 412, and a learning model generation unit 413 by executing programs in cooperation with the memory 42 which is a storage device such as a DRAM. The operation information acquisition unit 411 is implemented by, for example, benchmark software capable of measuring the response performance of the measurement drive apparatus 3A.

The internal storage 43 is a nonvolatile storage device such as an HDD(s) and/or an SSD(s) and stores a response performance measurement I/O pattern table 431 (FIG. 5) and a drive apparatus response performance data table 432 (FIG. 6).

Structure of Response Performance Measurement I/O Pattern Table 431

FIG. 5 is a diagram illustrating the structure of the response performance measurement I/O pattern table 431 according to Embodiment 1. The response performance measurement I/O pattern table 431 is a list of patterns of I/O commands to be transmitted to one measurement drive apparatus 3A connected to the learning model generation apparatus 4 when generating training data to learn the learning model 132M. The measurement drive apparatus 3A has drive types and capacity classes similar to those of the drive apparatus 3, but only one measurement drive apparatus 3A is connected to the learning model generation apparatus 4 in order to measure the response performance.

The response performance measurement I/O pattern table 431 has columns of a "Number" and an "I/O Pattern." The "Number" is identification information of the relevant I/O pattern. The "I/O Pattern" includes the transfer block length (s) and proportions of the number of command transmissions of both read commands and write commands. The I/O patterns include those for the read commands and the write commands which have the same transfer block length and different transfer block lengths. Also, the I/O patterns include those for the read commands and the write commands which have the same number of command transmissions and different numbers of command transmissions.

In FIG. 5, for example, the "I/O Pattern" of the "Number" "2" shows that "only 75% of write commands whose random-pattern transfer block length is 512 KB are transmitted to the measurement drive apparatus 3A." Also, the "I/O Pattern" of the "Number" "2" shows that "only 25% of read commands whose random-pattern transfer block length is 512 KB are transmitted to the measurement drive apparatus 3A." The I/O pattern of the "write command 75% and read commands 25%" indicates that, for example, in a case where a prescribed number of transmissions is a total of 1000 command transmissions, the write commands are transmitted 750 times and the read commands are transmitted 250 times.

Structure of Drive Apparatus Response Performance Data Table 432

FIG. 6 is a diagram illustrating the structure of the drive apparatus response performance data table 432 according to Embodiment 1. The drive apparatus response performance data table 432 is a list in which the response performance data of the measurement drive apparatus 3A are listed in association with the I/O patterns transmitted to the measurement drive apparatus 3A when generating the training data for the learning model 132M.

The drive apparatus response performance data table 432 has columns of a "Number," an "I/O Pattern," and "Response Performance Data." The "Number" is identification information of the relevant I/O pattern. The "I/O Pattern" is an "I/O Pattern" corresponding to the "Number" in the response performance measurement I/O pattern table 431. The "Response Performance Data" is an actual measurement value of the response performance data which was actually measured when transmitting input-output commands of the relevant "I/O Pattern" to the measurement drive apparatus 3A.

In FIG. 6, for example, the "Response Performance Data" measured when transmitting the input-output commands of the "I/O Pattern" of the "Number" "2" to the measurement drive apparatus 3A are "Minimum 110 ms, Average 160 ms, Maximum 210 ms." In other words, in a case of the "I/O Pattern" where a ratio of the number of transmissions of the write commands to the read commands is 75:25=3:1, the response time to the plurality of command transmissions is 110 milliseconds as a minimum value, 160 milliseconds as an average value, and 210 milliseconds as a maximum value. As an evaluation threshold described later, it is possible to adopt various kinds of statistical values (the minimum value, the average value, and maximum value as examples of such statistical values in this embodiment) of the plurality pieces of the response performance data indicating the response performance relative to the plurality of command transmissions.

Although it is not illustrated in the drawing, the drive apparatus response performance data table 432 stores, together with the "I/O Pattern," the corresponding operation information including a read transfer block length, a write transfer block length, a read-write command count, a drive type & capacity, etc.

Configuration and Processing of Control Apparatus 1 According to Embodiment 1

Figure 7:
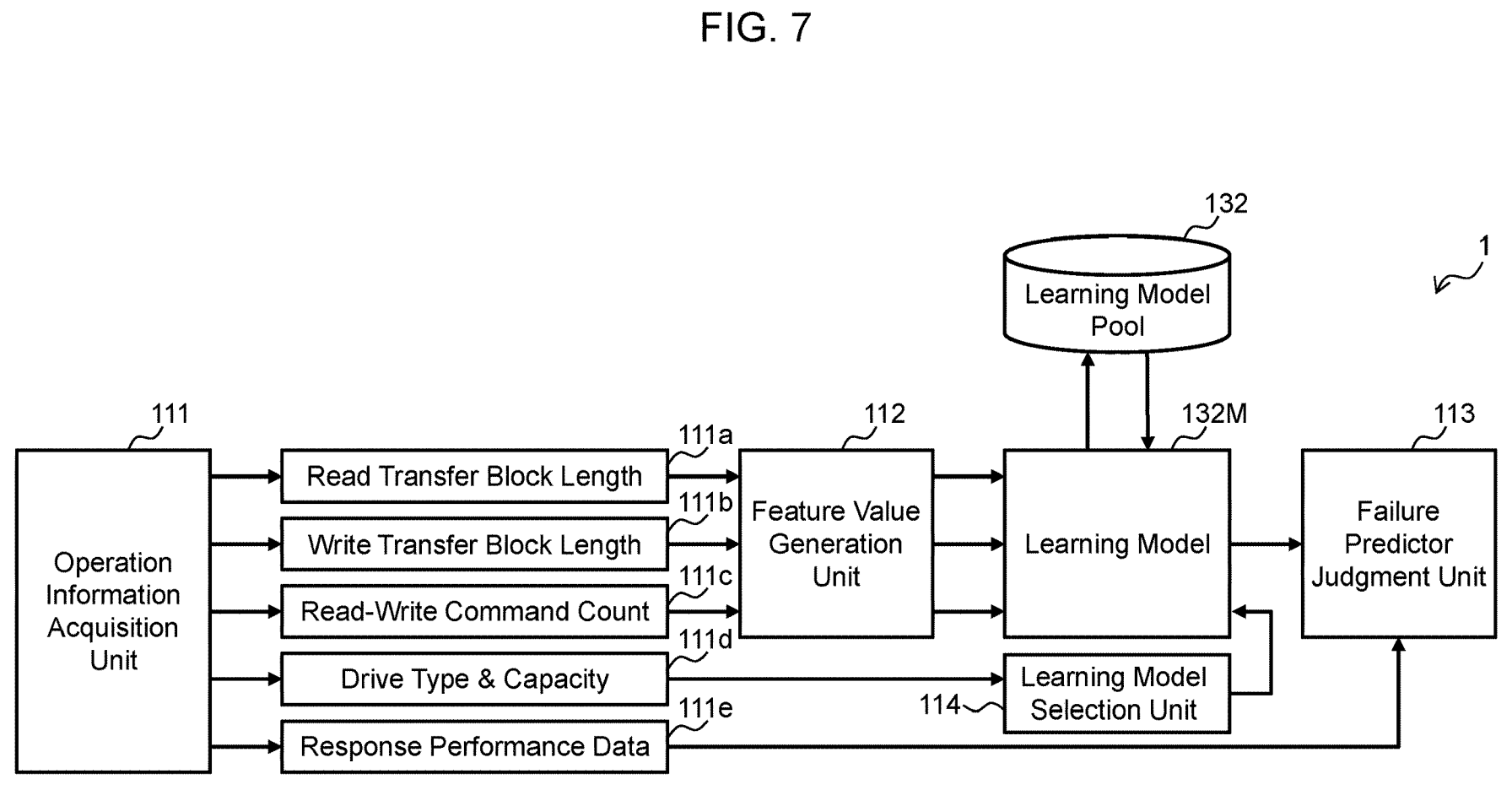

FIG. 7 is a diagram illustrating the configuration and processing of the control apparatus 1 according to Embodiment 1. Processing for judging the failure predictor of the drive apparatus 3 will be explained with reference to FIG. 1 and FIG. 7.

The operation information acquisition unit 111 for the control apparatus 1 acquires the operation information of the drive apparatus 3 under its control at constant intervals (for example, every three minutes). The operation information (an operation log) includes, for example, transfer block lengths relating to read commands and write commands which were issued from the host 5.

The operation information acquisition unit 111 inputs a read transfer block length 111a, a write transfer block length 111b, and a read-write command count 111c, out of the acquired operation information, to the feature value generation unit 112. Moreover, the operation information acquisition unit 111 inputs a drive type & capacity 111d, out of the acquired operation information, to the learning model selection unit 114. Furthermore, the operation information acquisition unit 111 inputs response performance data 111e to the failure predictor judgment unit 113.

The learning model selection unit 114 selects a learning model 132M according to the drive type & capacity 111d, which has been input, from the learning model pool 132 and deploys it in the memory 12.

The feature value generation unit 112 generates the respective feature values of the read transfer block length 111a, the write transfer block length 111b, and the read-write command count 111c, which have been input, and inputs the generated feature values to the learning model 132M.

The learning model 132M outputs the evaluation threshold of the response performance data 111e with respect to the respective features values of the read transfer block length 111a, the write transfer block length 111b, and the read-write command count 111c which have been input. The evaluation threshold is input to the failure predictor judgment unit 113.

The failure predictor judgment unit 113 compares the input response performance data 111e with this evaluation threshold of the response performance data 111e. If the response performance data 111e exceeds the evaluation threshold, the failure predictor judgment unit 113 judges that the drive apparatus 3 shows signs of failure and a failure may possibly occur at the relevant drive apparatus 3 in a predetermined near future.

Incidentally, the learning model 132M may receive input of the feature values of the input operation information and the response performance data and output the judgment result of whether this response performance data falls under the failure predictor (NG) or does not fall under the failure predictor (OK). In this case, the failure predictor judgment unit 113 outputs the judgment result of the learning model 132M as the judgment result regarding the failure predictor of the drive apparatus 3.

Configuration and Processing of Learning Model Generation Apparatus 4 According to Embodiment 1

Figure 8:
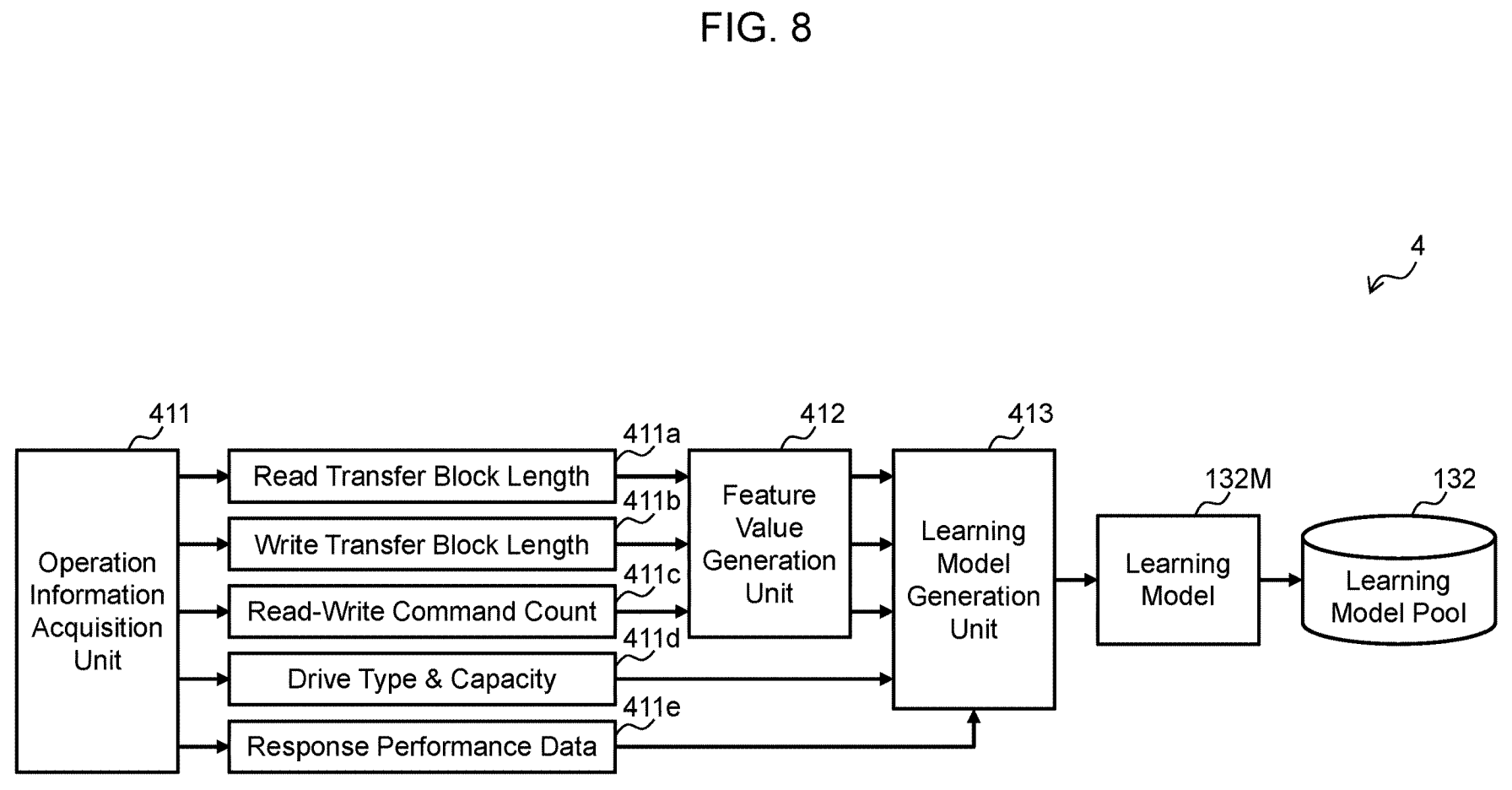

FIG. 8 is a diagram illustrating the configuration and processing of the learning model generation apparatus 4 according to Embodiment 1. Learning model generation processing will be explained with reference to FIG. 1 and FIG. 8.

When the operation information acquisition unit 411 for the learning model generation apparatus 4 receives an instruction from a user to start learning the learning model 132M, it activates benchmark software to execute the following processing. Specifically speaking, the operation information acquisition unit 411 sequentially transmits read commands and write commands, whose transfer block lengths of the I/O patterns stored in the response performance measurement I/O pattern table 431 are different, respectively to the measurement drive apparatus 3A over a first transmission period. Then, the operation information acquisition unit 411 acquires the operation information of the measurement drive apparatus 3A for each I/O pattern. The first transmission period is a relatively short period of time in minutes and shorter than 10 minutes (for example, 5 minutes).

Items of the operation information acquired by the operation information acquisition unit 411 are similar to those of the operation information acquired by the operation information acquisition unit 111 for the control apparatus 1 of the storage system S. The operation information acquisition unit 411 transmits the write commands and the read commands just for a prescribed number of transmissions for each I/O pattern. The operation information acquisition unit 411 acquires the operation information of the measurement drive apparatus 3A with respect to the write commands and the read commands. The operation information acquisition unit 411 calculates statistical values such as a maximum value, a minimum value, and an average value of the response performance data with respect to the write commands and the read commands, which are transmitted over the first transmission period, for each I/O pattern and stores the calculated statistical values in the drive apparatus response performance data table 432.

The operation information acquisition unit 411 inputs the operation information for each I/O pattern, which is stored in the drive apparatus response performance data table 432, to the feature value generation unit 412. Under this circumstance, the operation information which is input to the feature value generation unit 412 is a read transfer block length 411a, a write transfer block length 411b, and a read-write command count 411c. Also, the operation information acquisition unit 411 inputs a drive type & capacity 411d and response performance data 411e of the measurement drive apparatus 3A to the learning model generation unit 413.

The feature value generation unit 412 generates feature values of the read transfer block length 411a, the write transfer block length 411b, and the read-write command count 411c, which have been input, for each input I/O pattern and inputs the generated feature values to the learning model generation unit 413.

The learning model generation unit 413 learns, on the basis of each input drive type & capacity 411d, the feature values of the read transfer block length 411a, the write transfer block length 411b, and the read-write command count 411c for each I/O pattern and the response performance data 411e. Then, the learning model generation unit 413 generates, on the basis of each drive type & capacity, a learning model 132M to which the feature values of the read transfer block length, the write transfer block length, and the read-write command count are input and which outputs the evaluation threshold of the response performance data. The learning model generation unit 413 stores the generated learning model 132M in the learning model pool 132.

Drive Failure Predictor Judgment Processing According to Embodiment 1

Figure 9:
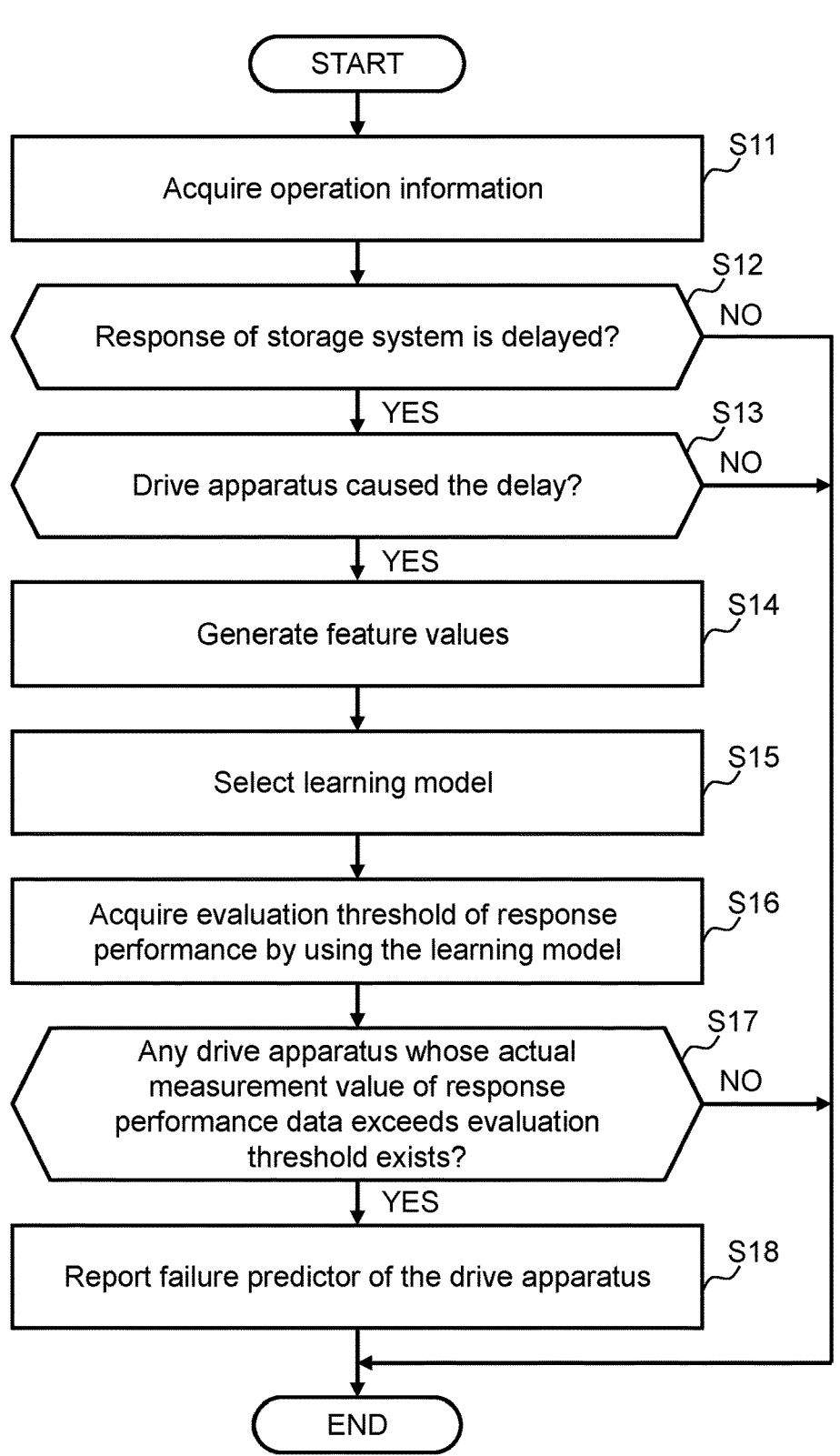
FIG. 9 is a flowchart illustrating drive apparatus failure predictor judgment processing according to Embodiment 1.

FIG. 9 is a flowchart illustrating drive failure predictor judgment processing according to Embodiment 1. The drive failure predictor judgment processing according to Embodiment 1 is executed by the control apparatus 1 for the storage system S at constant intervals (for example, every 3 minutes). Also, during the execution of the drive failure predictor judgment processing, the learning model 132M for each drive type and capacity of the connected drive apparatus 3 under the control of the control apparatus 1 is stored in the learning model pool 132.

Firstly, in step S11, the operation information acquisition unit 111 for the control apparatus 1 acquires the operation information of the drive apparatus 3.

Next, in step S12, the control apparatus 1 judges whether or not the operation information acquired in step S11 indicates the occurrence of a response delay of the storage system S. If the operation information indicates the occurrence of the response delay of the storage system S (step S12: YES), the control apparatus 1 proceeds to processing in step S13. On the other hand, if the operation information indicates the occurrence of something other than the response delay of the storage system S (step S12: NO), the control apparatus 1 terminates the drive failure predictor judgment processing.

In step S13, the control apparatus 1 judges whether or not the operation information acquired in step S11 indicates that the cause of occurrence of the response delay is the drive apparatus 3. If the operation information indicates that the cause of occurrence of the response delay is the drive apparatus 3 (step S13: YES), the control apparatus 1 proceeds to processing in step S14. On the other hand, if the operation information indicates that the cause of occurrence of the response delay is something other than the drive apparatus 3 (step S13: NO), the control apparatus 1 terminates the drive failure predictor judgment processing.

In step S14, the feature value generation unit 112 for the control apparatus 1 generates the respective feature values of the read transfer block length, the write transfer block length, and the read-write command count included in the operation information acquired in step S11 and inputs the generated feature values to the learning model 132M.

Next, in step S15, the learning model selection unit 114 selects a learning model 132M corresponding to the drive type and the capacity of the drive apparatus 3 that is the drive failure predictor judgment target, which is an output source of the operation information acquired in step S11, and deploys the selected learning model 132M in the memory 12. If the learning model 132M corresponding to the drive type and the capacity of the drive apparatus 3 that is the drive failure predictor judgment target has already been deployed in the memory 12, step S15 is omitted.

Then, in step S16, the failure predictor judgment unit 113 inputs the feature values generated in step S14 to the learning model 132M and acquires an evaluation threshold of the response performance data which is output from the learning model 132M.

Subsequently, in step S17, the failure predictor judgment unit 113 judges whether the drive apparatus 3 regarding which the actual measurement value of the response performance data included in the operation information acquired in step S11 exceeds the evaluation threshold of the response performance data acquired in step S116 exists or not. If the drive apparatus 3 regarding which the actual measurement value of the response performance data exceeds the evaluation threshold of the response performance data exists (step S17: YES), the failure predictor judgment unit 113 proceeds to processing in step S18. On the other hand, if the drive apparatus 3 regarding which the actual measurement value of the response performance data exceeds the evaluation threshold of the response performance data does not exist (step S17: NO), the failure predictor judgment unit 113 terminates the drive failure predictor judgment processing.

In step S18, the failure predictor judgment unit 113 copies data of the drive apparatus 3 with the drive apparatus ID, regarding which it was judged in step S17 that the actual measurement value of the response performance data exceeds the evaluation threshold of the response performance data, to a spare drive apparatus 3. Alternatively, the control apparatus 1 outputs a report of the failure predictor together with the relevant operation information to an administrative terminal (which is not illustrated in the drawing), etc. of the storage system S. An operator who operates the administrative terminal, etc. which is informed of the failure predictor of the drive apparatus 3 issues an instruction to a maintenance personnel to replace the drive apparatus 3 with the relevant drive apparatus ID.

Learning Model Generation Processing According to Embodiment 1

Figure 10:
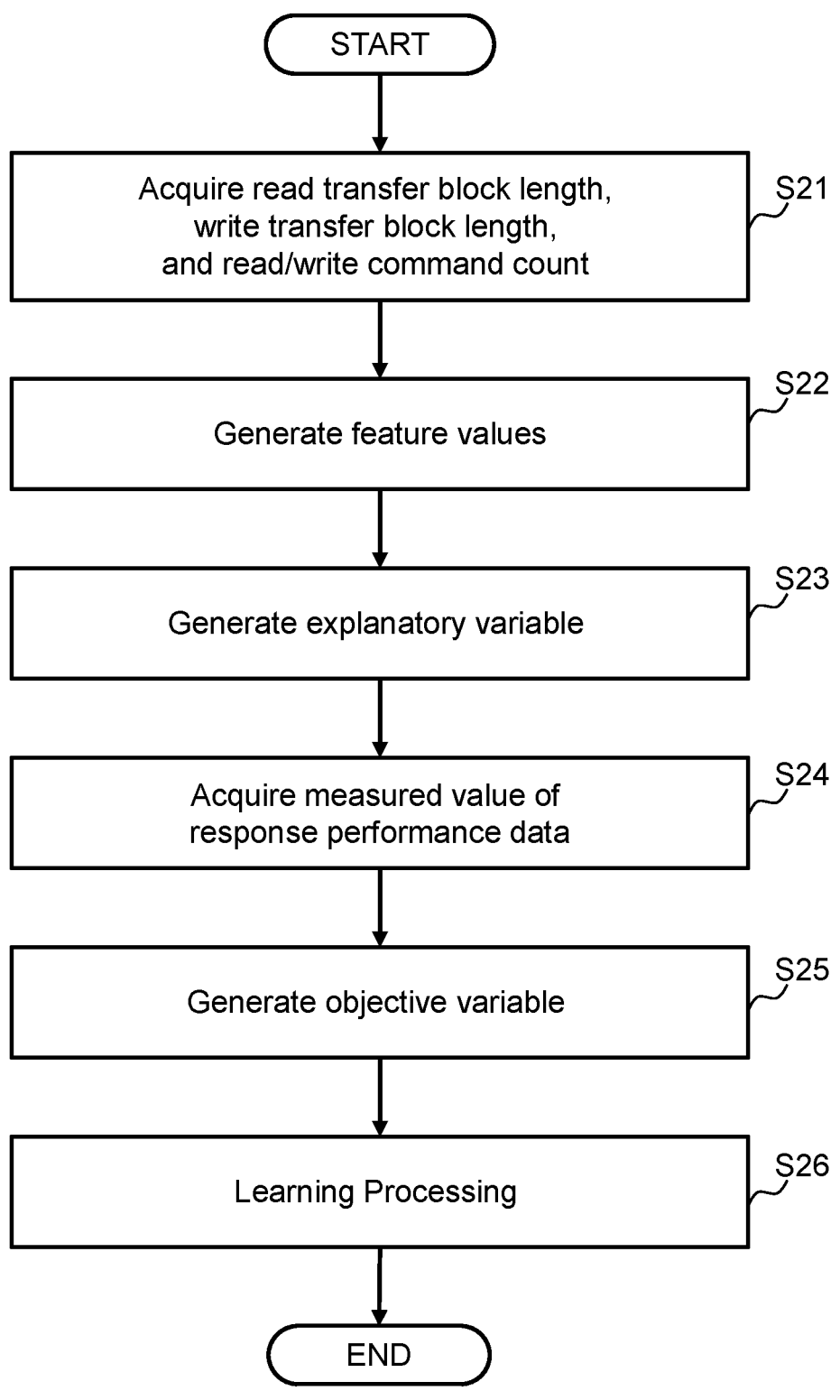
FIG. 10 is a flowchart illustrating learning model generation processing according to Embodiment 1.

FIG. 10 is a flowchart illustrating learning model generation processing according to Embodiment 1. During the execution of the learning model generation processing, the drive apparatus response performance data table 432 is generated for each drive type and capacity.

Firstly, in step S21, the operation information acquisition unit 411 for the learning model generation apparatus 4 acquires the operation information such as transfer block lengths and read/write command counts of read commands and write commands from the drive apparatus response performance data table 432.

Next, in step S22, the feature value generation unit 412 for the learning model generation apparatus 4 generates feature values from the operation information acquired in step S21.

Then, in step S23, the learning model generation apparatus 4 generates an explanatory variable(s) from the feature values generated in step S22.

Subsequently, in step S24, the operation information acquisition unit 411 acquires the actual measurement value of the response performance data from the drive apparatus response performance data table 432. Next, in step S25, the feature value generation unit 412 generates an objective variable from the actual measurement value of the response performance data acquired in step S21.

Then, in step S26, the learning model generation unit 413 for the learning model generation apparatus 4 generates a learning model 132M by learning training data which links the explanatory variable(s) generated in step S23 and the corresponding objective variable generated in step S25. So, the learning model 132M has learned the training data including the explanatory variable(s) and the objective variable.

Incidentally, the sequential order of steps S21 to S23 and steps S24 and S25 may be switched or these steps may be processed in parallel.

Advantageous Effect of Embodiment 1

In Embodiment 1, the specified information about the write commands and the read commands included in the operation information of the drive apparatus 3 is input to the learning model 132M and the failure predictor of the drive apparatus 3 is judged based on the output relating to the response performance by the learning model 132M.

Therefore, according to Embodiment 1, the failure predictor of the drive apparatus 3 in the storage system S can be detected more accurately based on the difference between the patterns of the write commands and the read commands.

Moreover, in Embodiment 1, the learning model 132M has already learned the training data including the explanatory variable(s) and the objective variable. The explanatory variable(s) is generated from the transfer block lengths and the command counts of the read commands and the write commands. The objective variable is generated from the response performance data of the measurement drive apparatus 3A measured when transmitting the read commands with the first transfer block length as many as the first command count and the write commands with the second transfer block length as many as the second command count to the measurement drive apparatus 3A. The response performance data is the response time, the IOPS, the latency, or the throughput of the measurement drive apparatus 3A with respect to the execution of the read commands and the write commands.

Therefore, according to Embodiment 1, the failure predictor of the drive apparatus 3 in the storage system S can be detected more correctly based on the difference between the patterns of the transfer block lengths and the command counts of the read commands and the write commands, and the response performance data.

Furthermore, in Embodiment 1, the learning model 132M has already learned the training data which is the response performance data measured with respect to the read commands and the write commands which have different transfer block lengths.

Therefore, according to Embodiment 1, the failure predictor of the drive apparatus 3 can be detected more accurately by using not only the command count ratio and the load of the read commands and the write commands, but also the learning model of the training data acquired by having the different block lengths per command.

Furthermore, in Embodiment 1, the learning model 132M outputs the evaluation threshold based on the statistical values of the response performance data and the failure predictor of the drive apparatus 3 is judged based on the comparison between the evaluation threshold and the actual measurement value of the response performance when the commands are executed.

Therefore, according to Embodiment 1, the failure predictor of the drive apparatus 3 can be judged more accurately from the statistical point of view on the basis of the objective evaluation threshold which is output by the learning model 132M and is statistically processed.

Furthermore, in Embodiment 1, the learning model 132M corresponding to the drive type and the capacity of the drive apparatus 3 is selected and the failure predictor of the drive apparatus 3 is judged by using the selected learning model 132M.

Even if drive apparatuses belong to the same parity group and have the same workload, their response performance may become considerably different from each other if models of the drive apparatuses are different. Accordingly, if the failure predictor is judged by generating the learning model without considering the drive type and the capacity, the failure predictor of the drive apparatus cannot be detected accurately and the drive apparatus which is normal may sometimes be mistakenly blocked. On the other hand, according to Embodiment 1, the failure predictor of the drive apparatus 3 can be detected more accurately based on the difference in the drive type and the capacity.

Now, an explanation will be provided about the construction of a better learning model which judges a delay in the response performance of the drive apparatus by learning data by including the training data acquired by using the read commands and the write command with different transfer block lengths.

Figure 11A:
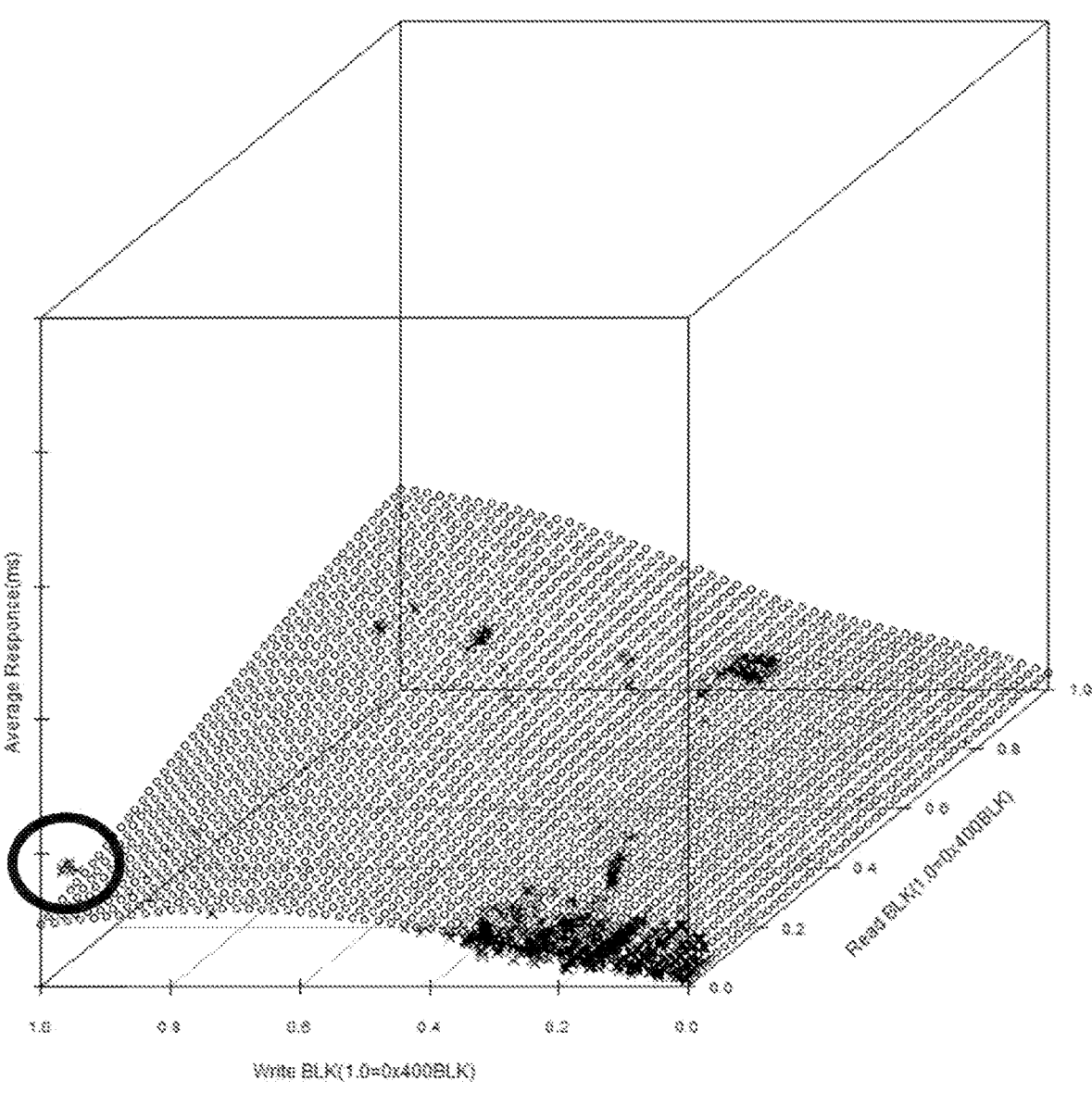
FIG. 11A is a diagram explaining performance evaluation results of a learning model (Comparative Example) which has learned only training data acquired by setting the same transfer block length per command regarding read commands and write commands.
Figure 11B:
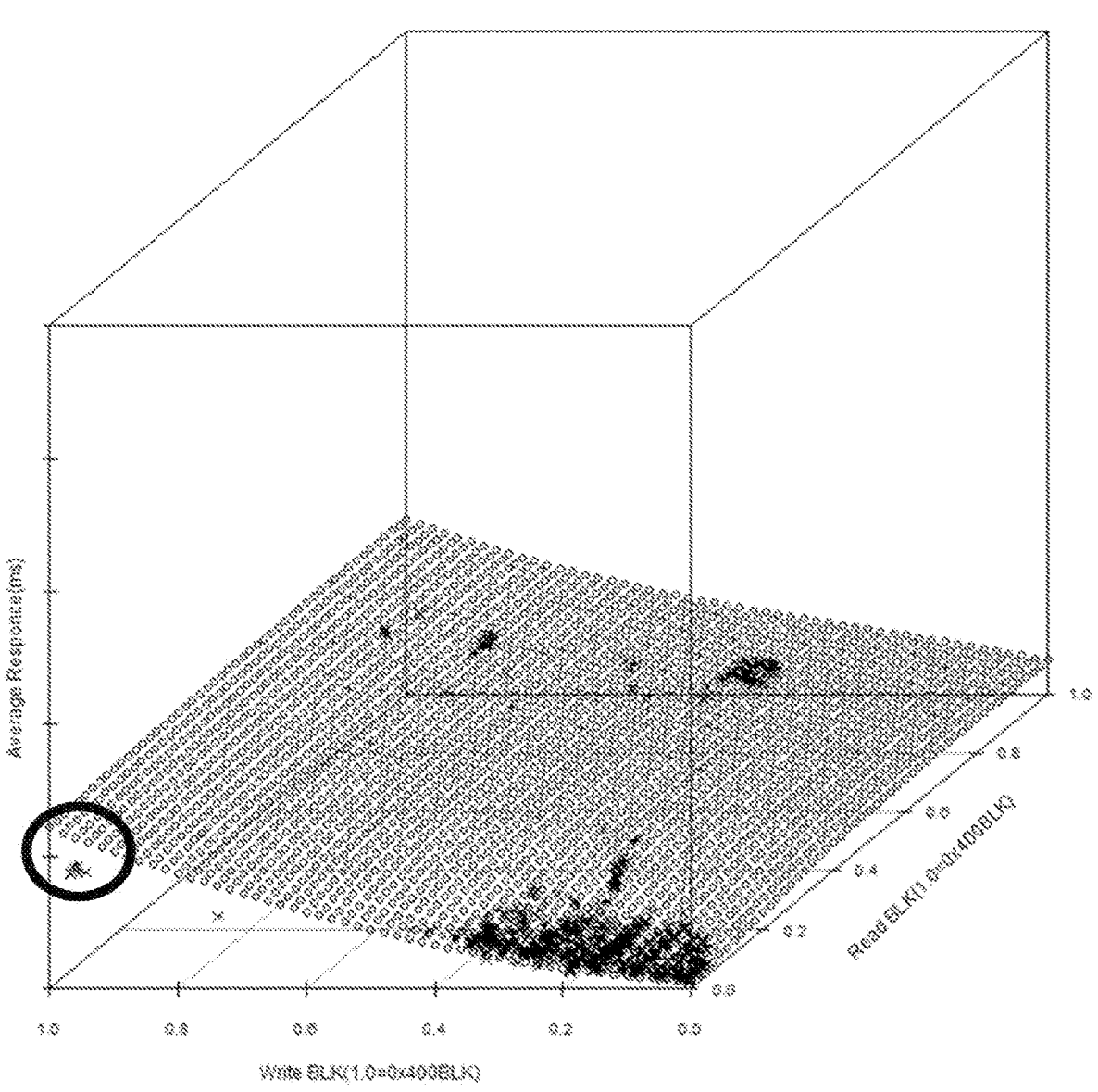
FIG. 11B is a diagram for explaining performance evaluation result of a learning model (Embodiment 1) which has learned data by including training data acquired by setting different same transfer block lengths per command for read commands and write commands.

FIG. 11A is a diagram for explaining the performance evaluation result of a learning model (Comparative Example) which has learned only the training data acquired by using read commands and write commands which have the same transfer block length per command. FIG. 11B is a diagram for explaining the performance evaluation result of the learning model (Embodiment 1) which has learned data by including the training data acquired by using read commands and write commands which have different transfer block lengths per command. FIG. 11A and FIG. 11B are the results of actual judgment of the response performance of the drive apparatus by using the learning model (Comparative Example) and the learning model (Embodiment 1).

Referring to FIG. 11A and FIG. 11B, in a three-dimensional space where a first axis is defined as "Write BLK" (transfer block length of write data), a second axis is defined as "Read BLK" (transfer block length of read data), and a third axis is defined as "Average Latency" (average response delay time), respectively, a judgment threshold value of the "Average Latency" corresponding to each combination of the "Write BLK" and the "Read BLK" is plotted with "○." Also, in FIG. 11A and FIG. 11B, the response performance of a normal drive apparatus in which no response delay has occurred is plotted with "×" in this three-dimensional space. Regarding the first axis and the second axis, a specified block length (for example, 400 blocks) is defined as 1.0 (reference) and each block length of the write data and the read data is indicated as a ratio to the reference.

For example, in Comparative Example, if the transfer block length of the "Write BLK" is 1.0 and the transfer block length of the "Read BLK" is approximately 0.0 to 0.2, the response performance of the normal drive apparatus as plotted with "×" exceeds the judgment threshold value of the response delay as plotted with "○" as indicated in an area surrounded with a circle mark in FIG. 11A. Specifically speaking, the occurrence of the response delay is mistakenly detected regarding the response performance of the normal drive apparatus.

On the other hand, in Embodiment 1, if the transfer block length of the "Write BLK" is 1.0 and the transfer block length of the "Read BLK" is approximately 0.0 to 0.2, the response performance of the normal drive apparatus as plotted with "×" is less than the judgment threshold value of the response delay as plotted with "○" as indicated in an area surrounded with a circle mark in FIG. 11B. Specifically speaking, the occurrence of the response delay is not mistakenly detected regarding the response performance of the normal drive apparatus.

In conclusion, referring to FIG. 11A and FIG. 11B, you can see that the learning model (Embodiment 1), as compared to the learning model (the comparative example), is a better learning model for which the judgment threshold value of the response delay is set appropriately and which judges the delay in the response performance of the drive apparatus.

Variation of Embodiment 1

In the aforementioned Embodiment 1, when generating the learning model 132M, the operation information is acquired by sequentially transmitting the read commands and the write commands, which have different transfer block lengths, respectively to the measurement drive apparatus 3A over the first transmission period. However, without limitation to this example, read commands and write commands which are provided with an idling period on a regular basis may be transmitted regardless of whether or not the read commands and the write commands to be transmitted to the measurement drive apparatus 3A have different transfer block lengths.

The idling period is a period of time shorter than 30 seconds, for example, two seconds, during which no load is placed on the measurement drive apparatus 3A. The "read commands and write commands which are provided with an idling period on a regular basis" are the read commands and the write commands which are provided with the idling period of two seconds, for example, at 30-second intervals.

There is a finding that by continuously applying the read commands and the write commands, which are provided with the idling period on the regular basis, to the measurement drive apparatus 3A, the operation information shows performance degradation of the drive apparatus more prominently as compared to the case without the idling period. Consequently, the learning model 132M which can judge the failure predictor more accurately can be learned by using, as the training data, the operation information of the measurement drive apparatus 3A acquired by continuously applying the read commands and the write commands which are provided with the idling period.

Furthermore, when acquiring the operation information which becomes the training data to generate the learning model 132M in the aforementioned Embodiment 1, the transmission period of the read commands and the write commands may be a second transmission period instead of the first transmission period, regardless of whether the idling period exists or not. The second transmission period is, for example, a period of time in units of ten thousand seconds, that is, 10,000 seconds or longer. By using the training data based on the operation information acquired by long duration measurement of the response performance over the second transmission period, it is possible to learn the learning model 132M capable of absorbing short-time fluctuations of the response performance of the drive apparatus and judging the failure predictor more accurately.

Specifically speaking, the training data of the learning model 132M includes at least any one of the following response performance data described below: first response performance data, second response performance data, third response performance data, and fourth response performance data.

The first response performance data is the response performance data measured when transmitting the read commands and the write commands, which have different transfer block lengths, to the measurement drive apparatus 3A. The second response performance data is the response performance data measured when transmitting the read commands and the write commands, which are provided with the idling period on the regular basis, to the measurement drive apparatus 3A. The third response performance data is the response performance data measured when continuously transmitting the read commands and the write commands, which have different transfer block lengths, to the measurement drive apparatus 3A over a specified amount of time. The fourth response performance data is the response performance data measured when continuously transmitting the read commands and the write commands, which is provided with the idling period on the regular basis, to the measurement drive apparatus 3A over a specified amount of time.

Figure 12:
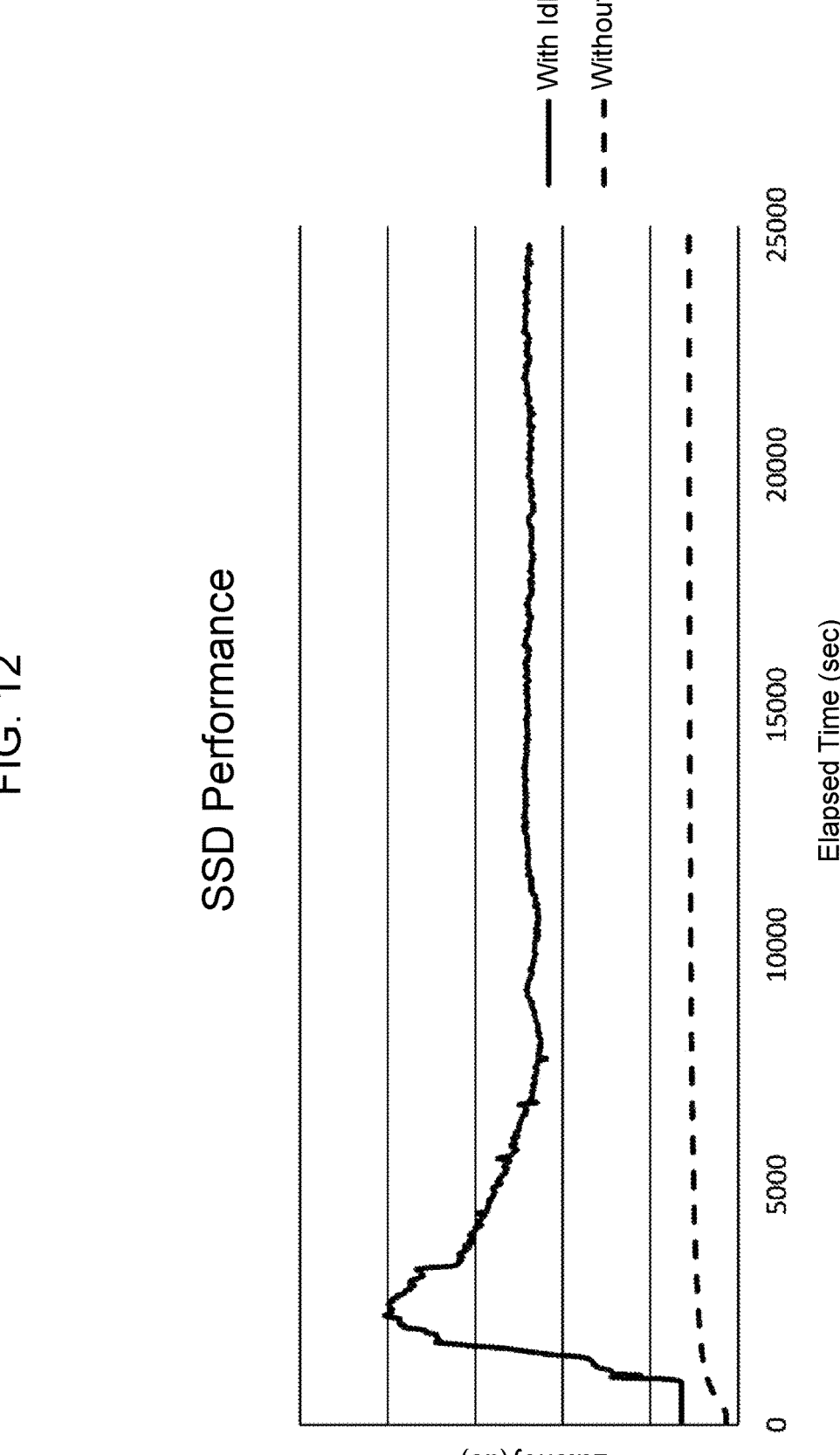
FIG. 12 is a diagram for explaining actual response performance acquired by transmitting read commands and write commands without inserting an idling period and transmitting the read commands and the write commands by inserting the idling period to a normal drive apparatus.

Now, an explanation will be provided about the construction of a better learning model which judges a delay in the response performance of the drive apparatus by learning data by including the training data acquired by inserting the idling period, during which no load is placed on the drive apparatus, into read commands and write commands on the regular basis. The idling period will be hereinafter referred to as "Idle." FIG. 12 is a diagram for explaining actual response performance acquired by transmitting read commands and the write commands, into which the idling period is not inserted, and read commands and the write commands, into which the idling period is inserted, to a normal drive apparatus. In FIG. 12, a horizontal axis is defined as "Elapsed Time (sec)" and a vertical axis is defined as "Latency (response time)."

The response performance of the drive apparatus with respect to the read commands and the write commands, into which the idling period is not inserted, is indicated with a broken-line graph indicated as "Without Idle" in FIG. 12. Also, the response performance of the drive apparatus with respect to the read commands and the write commands, into which the idling period is inserted, is indicated with a solid-line graph indicated as "With Idle" in FIG. 12.

The "Latency" of a normal drive apparatus varies greatly depending on whether the Idle is inserted into the read commands and the write commands or not, as illustrated in FIG. 12. Specifically speaking, the delay in the response performance of the normal drive apparatus becomes much longer by inserting the Idle into the read commands and the write commands. This proves that in order to judge the degradation in the response performance of the drive apparatus more accurately, it is important to use the learning model which has learned data by including the training data acquired by inserting the Idle into the read commands and the write commands. In other words, you can tell that a better learning model which judges the delay in the response performance of the drive apparatus can be constructed by learning data by including the training data acquired by inserting the Idle into the read commands and the write commands.

Also, as illustrated in FIG. 12, the response performance of the drive apparatus fluctuates considerably in a short period of time. Therefore, you can see that it is appropriate for the learning model, which judges the delay in the response performance of the drive apparatus, to be learned by using, as the training data, the response performance data measured for a long period of time, that is, a certain period of time or longer in order to exclude the short-time fluctuations.

Furthermore, there is a finding that if the Idle which is at least 30 seconds or less is inserted at 30-second intervals, the response delay becomes longer as compared to the case where the read commands and the write commands are applied continuously without the Idle. According to this finding, there is given an example of an appropriate method for inserting the Idle into the read commands and the write commands when acquiring the training data to learn the learning model for judging the delay in the response performance of the drive apparatus.

Embodiment 2

In Embodiment 1, the failure predictor of the drive apparatus 3 is judged by using the learning model 132M generated based on the read transfer block length, the write transfer block length, the read/write command count, and the response performance data which are included in the operation information.

However, without limitation to this example, the failure predictor of the drive apparatus 3 may be judged by generating the learning model 132M based on the operation information other than the read transfer block length, the write transfer block length, the read/write command count, and the response performance data.

Configuration and Processing of Control Apparatus 1B According to Embodiment 2

Figure 13:
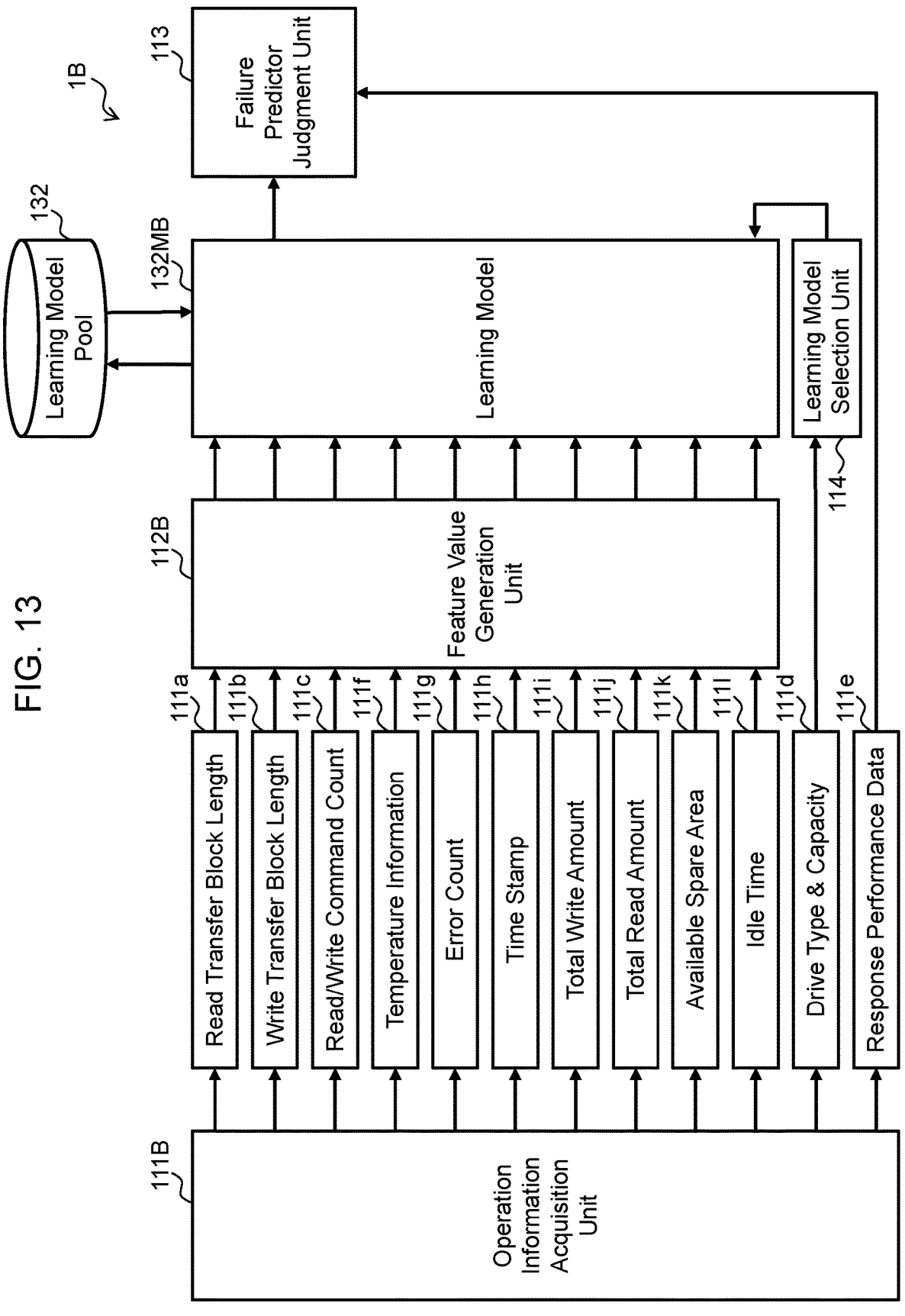
FIG. 13 is a diagram illustrating the configuration and processing of a control apparatus according to Embodiment 2.

FIG. 13 is a diagram illustrating the configuration and processing of a control apparatus 1B according to Embodiment 2.

As compared to the operation information acquired by the operation information acquisition unit 111 for the control apparatus 1 according to Embodiment 1, the operation information acquired by an operation information acquisition unit 111B for the control apparatus 1B according to Embodiment 2 is different because it further includes the following operation information. Specifically speaking, it further includes temperature information 111*f*, an error count 111*g*, a time stamp 111*h*, a total write amount 111*i*, a total read amount 111*j*, an available spare area 111*k*, idle time 111*l*, and so on. These pieces of operation information is, for example, performance statistical information such as S.M.A.R.T. (Self-Monitoring Analysis and Reporting Technology) information of the drive apparatus 3.

The temperature information 111*f* is an apparatus temperature of the drive apparatus 3. The error count 111*g* is the number of error occurrences upon the execution of the relevant write commands or read commands. The time stamp 111*h* is the execution date and time of the relevant write commands and read commands in the drive apparatus 3. The total write amount 111*i* is a total write capacity by execution of the relevant write commands. The total read amount 111*j* is a total read capacity by the execution of the relevant read commands. The available spare area 111*k* is a free space of the drive apparatus 3 upon the execution of the relevant write commands or the read commands. The idle time 111*l* is the length of the idling period (for example, two seconds) inserted into the relevant write commands or the read commands and insertion intervals (for example, 30-second intervals).

Specifically speaking, in Embodiment 2, the learning model 132MB is a learning model which has learned the training data with feature values of the operation information, to which the performance statistical information is added, as explanatory variables as compared to the operation information of Embodiment 1. Also, in Embodiment 2, as compared to the operation information in Embodiment 1, the feature values of the operation information, to which performance statistical information is added, are input to the learning model 132MB and an evaluation threshold of the response performance data 111*e* is output with respect to the feature values of this operation information.

Configuration and Processing of Learning Model Generation Apparatus 4B According to Embodiment 2

Figure 14:
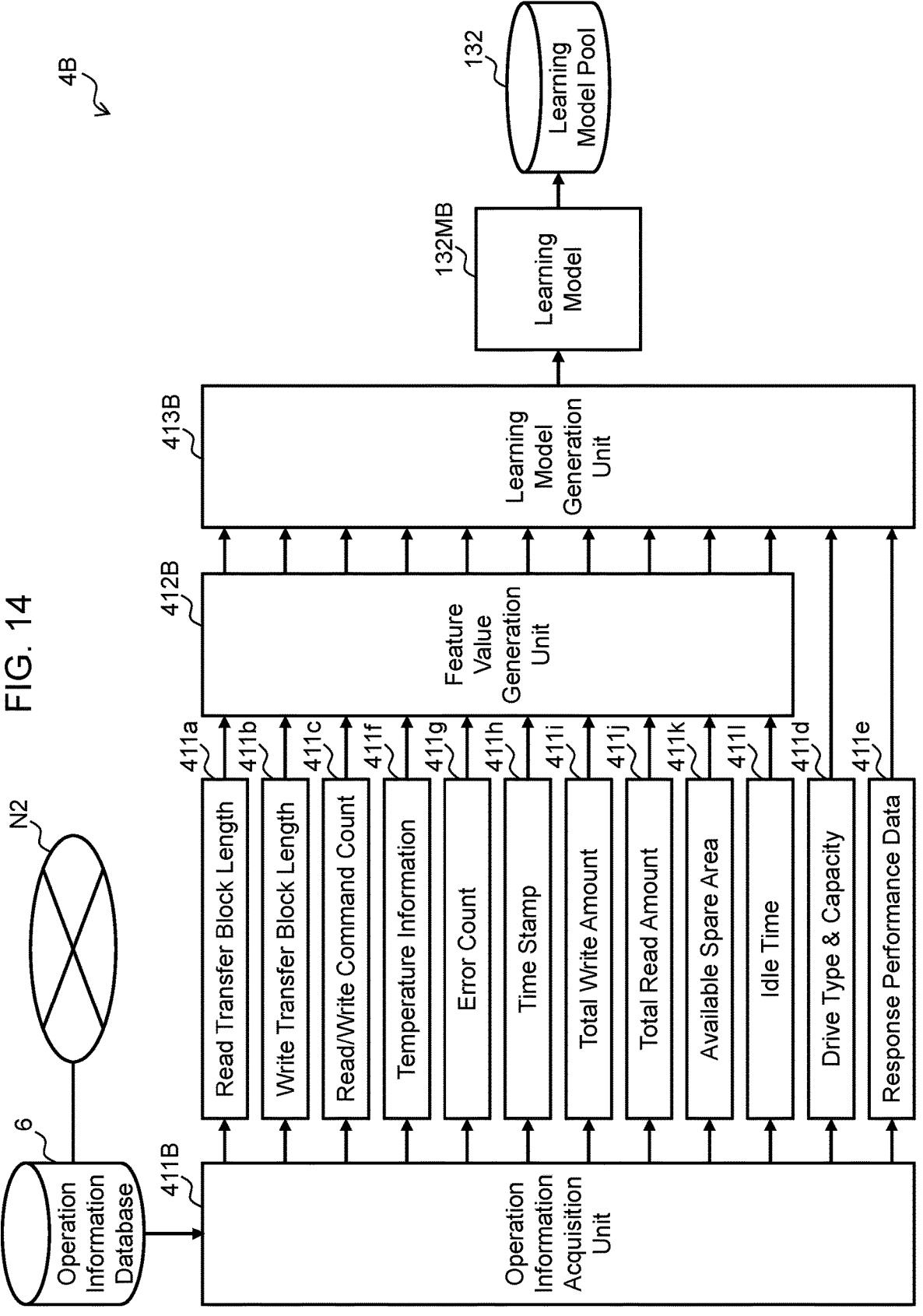
FIG. 14 is a diagram illustrating the configuration and processing of a learning model generation apparatus according to Embodiment 2.

FIG. 14 is a diagram illustrating the configuration and processing of a learning model generation apparatus 4B according to Embodiment 2.

When receiving an instruction from the user to start learning the learning model 132MB, an operation information acquisition unit 411B for the learning model generation apparatus 4B according to Embodiment 2 activates the benchmark software and acquires the operation information of the measurement drive apparatus 3A.

Under this circumstance, as compared to the operation information according to Embodiment 1, the operation information acquired by the operation information acquisition unit 411B for the learning model generation apparatus 4B according to Embodiment 2 is different and further includes the following operation information. Specifically speaking, the operation information acquired by the operation information acquisition unit 411B for the learning model generation apparatus 4B according to Embodiment 2 further includes: temperature information 411*f*, an error count 411*g*, a time stamp 411*h*, a total write amount 411*i*, a total read amount 411*j*, an available spare area 411*k*, idle time 411*l*, and so on. These pieces of operation information is, for example, performance statistical information of the drive apparatus 3 in a manner similar to the operation information acquired by the operation information acquisition unit 111B for the control apparatus 1B.

The temperature information 411*f*, the error count 411*g*, the time stamp 411*h*, the total write amount 411*i*, the total read amount 411*j*, the available spare area 411*k*, and the idle time 411*l* are similar to the temperature information 111*f* to the idle time 111*l*, respectively.

Specifically speaking, in Embodiment 2, the learning model 132MB is generated by learning the training data in which the feature values of the operation information with the performance statistical information added thereto are the explanatory variables and the response performance data is the objective variable, as compared to the operation information in Embodiment 1.

Advantageous Effect of Embodiment 2

In Embodiment 2, the operation information used for the judgment of the failure predictor of the drive apparatus 3 and the training data learned when generating the learning model 132M include the performance statistical information such as the S.M.A.R.T. information of the drive apparatus.

Therefore, in Embodiment 2, the failure predictor of the drive apparatus 3 can be detected more accurately based on the operation information of the drive apparatus 3 other than the read transfer block length, the write transfer block length, and the read/write command count.

Variation of Embodiments 1 and 2

In Embodiments 1 and 2, the operation information acquisition unit 411, 411B acquires the operation information of the measurement drive apparatus 3A and stores it in the drive apparatus response performance data table 432.

However, without limitation to the operation information of the measurement drive apparatus 3A, the operation information of drive apparatuses 3 or measurement drive apparatuses 3A of a large number of other people are collected via a public network such as the Internet N2 as illustrated in FIG. 14. Then, the operation information is accumulated in an operation information database 6 on the basis of each drive type & capacity. The learning model generation unit 413, 413B may generate the learning model 132M, 132MB by learning the training data based on the operation information of the drive apparatuses 3 or the measurement drive apparatuses 3A of the large number of other people, on the basis of each drive type & capacity, which is accumulated in the operation information database 6.

By collecting and learning a large amount of the operation information of the drive apparatuses 3 or the measurement drive apparatuses 3A of the large number of other people via the public network such as the Internet N2 as described above, it is possible to enhance the model accuracy of the learning model 132MB and detect the failure predictor of the drive apparatus 3 more accurately.

The embodiments according to the disclosure of the present application have been described above in detail; however, the disclosure of the present application is not limited to the aforementioned embodiments and can be changed in various manners within the scope not departing from the gist thereof. For example, the aforementioned embodiments have been described in detail in order to explain the present invention in an easily comprehensible manner and are not necessarily limited to those having all the configurations explained above. Also, regarding part of the configuration of the aforementioned embodiment, it is possible to add, delete, or replace the configuration of another embodiment.

Furthermore, regarding each aforementioned configuration, function unit, and processing unit, etc., part or whole of them may be implemented by hardware by, for example, designing it with integrated circuits. Moreover, each aforementioned configuration, function, etc., may be implemented by software by a processor by interpreting and executing a program for implementing each function. Information such as programs, tables, and files for implementing each function may be stored in memories, storage devices such as HDDs and SSDs, or recording media such as IC cards, SD cards, and DVDs.

Furthermore, in each aforementioned drawing, control lines and information lines which are considered to be necessary for the explanation are indicated; however, not all control lines or information lines for implementation may be necessarily indicated. For example, it may be considered that practically almost all the components are connected to each other.

Furthermore, the aforementioned allocation pattern of the respective functions and data of the storage system S, the control apparatus 1, 1B, and the learning model generation apparatus 4, 4B is merely one example. The arrangement pattern of the respective functions and data can be changed to an optimum arrangement pattern from the viewpoint of hardware and software performance, processing efficiency, communication efficiency, etc.

What is claimed is:

1. A storage system, comprising:

a drive apparatus for storing data and a control apparatus for controlling input and output of data to and from the drive apparatus, wherein the control apparatus includes a processor and a memory, wherein the memory stores a learning model for evaluating a response performance of the drive apparatus with respect to execution of commands relating to the input and output by the control apparatus, and wherein the processor:

acquires operation information of the drive apparatus;

inputs specified information regarding the commands included in the operation information to the learning model; and judges a failure predictor of the drive apparatus based on a comparison between an evaluation threshold for evaluating response performance data indicating the response performance of the drive apparatus output by the learning model in response to the input of the specified information and the response performance data.

2. The storage system according to claim 1, wherein the specified information includes a transfer block length and a command count of both read commands and write commands among the commands;

wherein the learning model has already learned training data that includes an explanatory variable which is generated from the transfer block length and the command count of the read commands and the write commands, and an objective variable which is generated from response performance data indicating a response performance of a measurement drive apparatus measured when transmitting the read commands with a first transfer block length as many as a first command count to the measurement drive apparatus and transmitting the write commands with a second transfer block length as many as a second command count to the measurement drive apparatus; and wherein the response performance data is response time, IOPS (Input/Output Per Second), latency, or throughput of the measurement drive apparatus with respect to execution of the read commands and the write commands.

3. The storage system according to claim 2, wherein the training data includes the response performance data measured when transmitting the read commands and the write commands, regarding which the first transfer block length and the second transfer block length are different, to the measurement drive apparatus.

4. The storage system according to claim 3, wherein the training data includes the response performance data measured when transmitting the read commands and the write commands, regarding which the first transfer block length and the second transfer block length are different, continuously to the measurement drive apparatus over a specified amount of time.

5. The storage system according to claim 2, wherein the training data includes the response performance data measured when transmitting the read commands and the write commands which are provided, on a regular basis, with an idling period where no load is placed on the measurement drive apparatus, to the measurement drive apparatus.

6. The storage system according to claim 5, wherein the training data includes the response performance data measured when transmitting the read commands and the write commands, which are provided with the idling period on a regular basis, continuously to the measurement drive apparatus over a specified amount of time.

7. The storage system according to claim 2, wherein the memory stores a plurality of learning models, including the learning model, in correspondence with a drive type and a capacity of the drive type, each learning model having already learned the training data of the drive apparatus, and wherein the processor:

selects the learning model corresponding to each drive type and each capacity of the drive apparatus; and inputs the specified information to the selected learning model.

8. The storage system according to claim 2, wherein the specified information includes specified performance statistical information of the drive apparatus; and wherein the learning model has already learned the training data including the specified performance statistical information.

9. The storage system according to claim 8, wherein the learning model has already learned the training data including the specified performance statistical information of other drive apparatuses possessed by other storage systems which are collected via a network.

10. A learning model for evaluating response performance of a drive apparatus with respect to read commands and write commands relating to input and output of data to the drive apparatus in a storage system including the drive apparatus for storing data and a control apparatus for controlling the input and output of data to and from the drive apparatus, wherein the learning model which already learned training data that includes an explanatory variable which is generated from transfer block lengths and a command count of the read commands and the write commands, and an objective variable which is generated from response performance data indicating a response performance of a measurement drive apparatus measured when transmitting the read commands with a first transfer block length as many as a first command count to the measurement drive apparatus and transmitting the write commands with a second transfer block length as many as a second command count to the measurement drive apparatus;

wherein the training data includes the response performance data which is one or more of the following:

the response performance data measured when transmitting the read commands and the write commands, regarding which the first transfer block length and the second transfer block length are different, to the measurement drive apparatus;

the response performance data measured when transmitting the read commands and the write commands which are provided, on a regular basis, with an idling period where no load is placed on the measurement drive apparatus, to the measurement drive apparatus;

the response performance data measured when transmitting the read commands and the write commands, regarding which the first transfer block length and the second transfer block length are different, continuously to the measurement drive apparatus over a specified amount of time; and the response performance data measured when transmitting the read commands and the write commands, which are provided with the idling period on a regular basis, continuously to the measurement drive apparatus over a specified amount of time; and wherein the control apparatus is caused to function so as to output an evaluation threshold of the drive apparatus to evaluate the response performance of the drive apparatus by receiving input of the transfer block lengths and the commands count of the read commands and the write commands which are transmitted by the control apparatus to the drive apparatus.

11. A learning model generation method for evaluating response performance of a drive apparatus with respect to read commands and write commands relating to input and output of data to the drive apparatus in a storage system including the drive apparatus for storing data and a control apparatus for controlling the input and output of data to and from the drive apparatus, wherein the learning model generation apparatus method includes each of the following processing for:

acquiring transfer block lengths and a command count of the read commands and the write commands;

generating feature values from the transfer block lengths and the command count;

generating an explanatory variable from the feature values;

acquiring response performance data indicating response performance of a measurement drive apparatus measured when transmitting the read commands with a first transfer block length as many as a first command count to the measurement drive apparatus and transmitting the write commands with a second transfer block length as many as a second command count to the measurement drive apparatus;

generating an objective variable from the response performance data; and learning training data including the explanatory variable and the objective variable; and wherein the training data includes the response performance data which is one or more of the following:

the response performance data measured when transmitting the read commands and the write commands, regarding which the first transfer block length and the second transfer block length are different, to the measurement drive apparatus;

the response performance data measured when transmitting the read commands and the write commands which are provided, on a regular basis, with an idling period where no load is placed on the measurement drive apparatus, to the measurement drive apparatus;

the response performance data measured when transmitting the read commands and the write commands, regarding which the first transfer block length and the second transfer block length are different, continuously to the measurement drive apparatus over a specified amount of time; and the response performance data measured when transmitting the read commands and the write commands, which are provided with the idling period on a regular basis, continuously to the measurement drive apparatus over a specified amount of time.

* * * * *